United States Patent
Tsuge

(10) Patent No.: US 7,158,879 B2
(45) Date of Patent: Jan. 2, 2007

(54) NAVIGATION APPARATUS AND NAVIGATION SERVER

(75) Inventor: Masakuni Tsuge, Minato-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 188 days.

(21) Appl. No.: 11/015,995

(22) Filed: Dec. 17, 2004

(65) Prior Publication Data

US 2005/0137792 A1    Jun. 23, 2005

(30) Foreign Application Priority Data

Dec. 17, 2003   (JP)   ............... 2003-418986

(51) Int. Cl.
*G01C 21/28* (2006.01)
(52) U.S. Cl. ................. 701/209; 701/211; 340/995.12; 348/211.3
(58) Field of Classification Search ................ 701/209, 701/200, 210, 208, 211; 340/995.23, 995.17, 340/995.19, 993, 995.12; 348/211.3, 211.9; 455/456.1, 414.3; 709/200
See application file for complete search history.

(56) References Cited

U.S. PATENT DOCUMENTS 6,456,934 B1 * 9/2002 Matsunaga et al. ......... 701/210
2001/0001847 A1 * 5/2001 Hessing ...................... 701/209
2003/0236613 A1 * 12/2003 Satoh et al. ................. 701/200
2004/0044470 A1 * 3/2004 Matsuoka et al. .......... 701/209

FOREIGN PATENT DOCUMENTS

| JP | 09-218048 | 8/1997 |
| JP | 2003-121168 | 4/2003 |

\* cited by examiner

*Primary Examiner*—Tuan C To
(74) *Attorney, Agent, or Firm*—Lahive & Cockfield LLP; Anthony A. Laurentano, Esq.

(57) ABSTRACT

The invention provides a navigation apparatus and a navigation server capable of providing information to the user enabling comparison between a route that the user is actually traveling and a different route. According to a car navigation apparatus 200, a route setup unit 230 sets up plural routes. An actual route recognition unit 231 recognizes an "actual route" of the vehicle M. Further, a virtual route recognition unit 232 recognizes a "virtual route" that differs from the actual route. Moreover, a virtual travel information recognition unit 240 recognizes a "virtual travel information" containing a virtual position of the vehicle M on the virtual route. The actual travel information, the actual route, the virtual travel information and the virtual route are displayed on a liquid crystal panel 250.

13 Claims, 5 Drawing Sheets

NAVIGATION APPARATUS AND NAVIGATION SERVER

BACKGROUND OF THE INVENTION

1. Field of the Invention

The present invention relates to a navigation apparatus for guiding a movable object to a target position through provision of information to the movable object. It also relates to a traffic information management system for managing traffic information based on communication with the movable object. Further, the present invention relates to a navigation server acting as a road traffic information source for providing road traffic information to the navigation apparatus.

2. Description of the Related Art

As disclosed for example in Japanese Patent Laid-Open Publication No. 9-218048 and No. 2003-121168, car navigation apparatuss mounted to vehicles having functions to setup a guidance route to a target position and to display the guidance route and the present position of a movable object are known. In general, a user drives the vehicle according to the guidance route displayed on the car navigation apparatus.

However, if the user drives the vehicle along a route different from the guidance route displayed on the car navigation apparatus, the user cannot obtain information on, for example, how long it will take to reach the target position. Therefore, the user cannot compare the route that he/she is actually traveling with a different route.

SUMMARY OF THE INVENTION

Therefore, the present invention solves the problems of the prior art by providing a navigation apparatus and a navigation server capable of providing information enabling the user to compare the route that the movable object is actually traveling with a rout that differs therefrom.

In order to solve the above-mentioned problems, the navigation apparatus according to the present invention comprises a road traffic information recognition means for recognizing road traffic information based on communication with a road traffic information source, an actual travel information recognition means for recognizing an actual travel information including a position of the movable object and a target position thereof, a route setup means for setting up plural routes for reaching the target position based on the road traffic information recognized by the road traffic information recognition means and the actual travel information recognized by the actual travel information recognition means, an actual route recognition means for recognizing, out of the plural routes set up by the route setup means, a route on which the movable object is actually traveling as an actual route based on the actual travel information recognized by the actual travel information recognition means, a virtual route recognition means for recognizing, out of the plural routes set up by the route setup means, a route that differs from the actual route as a virtual route, a virtual travel information recognition means for recognizing a virtual travel information including a virtual position of the movable object on the virtual route based on the road traffic information recognized by the road traffic information recognition means, and a display means for displaying the actual travel information, the actual route, the virtual travel information and the virtual route.

According to the navigation apparatus of the present invention, the "actual route" on which the movable object is actually traveling, the "actual travel information" including the position of the movable object and the target position thereof, the "virtual route" that differs from the actual route, and the "virtual travel information" including the virtual position of the movable object are displayed.

Since the "virtual route" is a route set up based on the actual travel information and the road traffic information, it is highly possible that the user will select it as a route different from the actual route in view of both routes. Further, the "virtual travel information" is based on road traffic information, so through it is virtual information, it is highly reliable having reflected the actual road traffic information. Thereby, the value and reliability of the virtual travel information on the virtual route is enhanced.

Therefore, the present invention is capable of providing to the user information such as the "virtual travel information" helpful in enabling the user to compare the "actual route" that the object is actually traveling with the "virtual route".

The meaning of the term "recognizing" something by the means being the components of the present invention refers for example to reading, receiving or acquiring something from a database, a storage unit or an outside information source, or for example to estimating, setting up, measuring or computing something by processing the data acquired from the database or the like. Further, the term "movable object" includes the user carrying the navigation apparatus in addition to the vehicle such as a car to which the navigation apparatus is mounted.

Further, the navigation apparatus of the present invention characterizes in that the virtual travel information recognition means recognizes the virtual travel information including the virtual position of the movable object assuming that the movable object has traveled on the virtual route for a travel time from a certain position to a present position.

According to the navigation apparatus of the present invention, it is possible to recognize the virtual travel information including the virtual position of an object assuming that it has traveled on the virtual route for a travel time from a certain position to the present position.

Moreover, the navigation apparatus of the present invention characterizes in that the road traffic information recognition means recognizes the road traffic information intermittently; and every time the road traffic information recognition means recognizes the road traffic information, the route setup means updates the setup of the routes, the actual route recognition means updates the recognition of the actual route, the virtual route recognition means updates the recognition of the virtual route, the virtual travel information recognition means updates the recognition of the virtual travel information, and the display means updates the display.

Even further, the navigation apparatus according to the present invention characterizes in that every time the movable object passes a position that has been set up intermittently, or every time a predetermined period of time passes during the travel time of the movable object, or every time the movable object moves for a predetermined distance, the road traffic information recognition means recognizes the road traffic information intermittently.

According to the navigation apparatus of the present invention, since the road travel information is recognized intermittently, the load of the information processing for route setup or recognition of virtual travel information based on the road traffic information can be reduced. Therefore, virtual travel information or the like updated intermittently can be provided promptly to the user.

The navigation server according to the present invention for solving the above-mentioned problems characterizes in comprising an actual travel information recognition means for recognizing actual travel information of a movable object based on communication with the navigation apparatus mentioned above; a route recognition means for recognizing plural routes for the movable object based on an actual travel information recognized by the actual travel information recognition means, and means for providing, as a road traffic information source, road traffic information of the plural routes recognized by the route recognition means to the navigation apparatus.

According to the navigation server of the present invention, by providing road traffic information on plural routes to the navigation apparatus, it enables the navigation apparatus to set up routes and to recognize virtual travel information based on the provided road traffic information. Further, since the road traffic information provided to the navigation apparatus is limited to that related to the plural routes, it reduces the load of information processing on the navigation apparatus related to the road traffic information. Moreover, it enables to provide to the user through the navigation apparatus the "virtual travel information" helpful in enabling the user to compare the "actual route" that the object is actually traveling with the "virtual route".

DETAILED DESCRIPTION OF THE PREFERRED EMBODIMENTS

Now, preferred embodiments of the navigation server and the navigation apparatus according to the present invention will be described with reference to the drawings.

Figure 1:
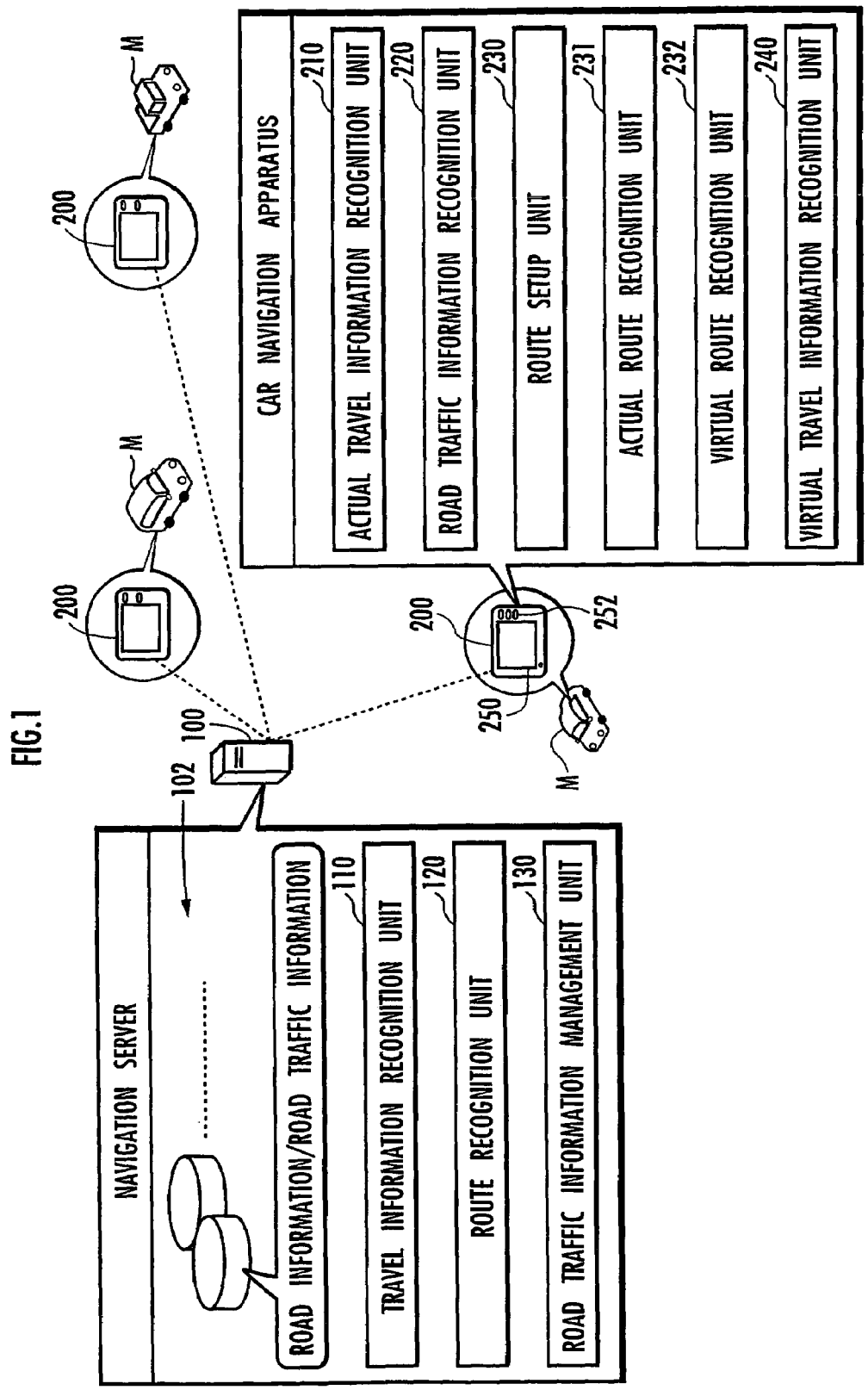
FIG. 1 is a diagram explaining the configuration of a traffic information management system and a navigation apparatus according to a preferred embodiment of the present invention.

First, with reference to FIG. 1, the configuration of a navigation server 100 and a car navigation apparatus (navigation apparatus) 200 mounted to a vehicle M will be described.

The navigation server 100 is equipped with a DB 102, a travel information recognition unit 110, a route recognition unit 120, and a road traffic information management unit 130.

The DB 102 manages various information such as road information (map information) and road traffic information as data.

The travel information recognition unit 110 recognizes "actual travel information" of the vehicle M based on communication with the car navigation apparatus 200.

The route recognition unit 120 recognizes plural "routes" of the vehicle M based on the "actual travel information" of the vehicle M recognized by the travel information recognition unit 110.

Based on the communication with plural motor vehicles M mounting the car navigation apparatus 200, the road traffic information management unit 130 gathers and recognizes the "actual travel information" including the present position, the target position and the direction of travel of each of the plural vehicles M. Moreover, the road traffic information management unit 130 computes and recognizes the "road traffic information" such as the predicted travel time between links and the degree of traffic jam on the road that the vehicle M is traveling, based on the "actual travel information" of the vehicle M. Further, the road traffic information management unit 130 can receive and recognize the road traffic information from FM radio stations and/or beacons (not shown) disposed on the road. Moreover, the road traffic information management unit 130 sends and provides to the car navigation apparatus 200 the road traffic information of plural routes recognized by the route recognition unit 120.

The car navigation apparatus 200 is equipped with an actual travel information recognition unit 210, a road traffic information recognition unit 220, a route setup unit 230, an actual route recognition unit 231, a virtual route recognition unit 232, a virtual travel information recognition unit 240, a liquid crystal panel (display means) 250, and operation buttons 252.

The actual travel information recognition unit 210 recognizes the "actual travel information" including the position and the target position of the vehicle M. Actually, the actual travel information recognition unit 210 measures the position of the vehicle M by appropriately utilizing a GPS or based on the output of a gyro sensor (not shown). Further, the actual travel information recognition unit 210 recognizes the target position of the vehicle M set up by the user through manipulation of the operation buttons 252. Moreover, the actual travel information recognition unit 210 measures and recognizes the direction of travel, the velocity and the acceleration of the vehicle M based on the output of a velocity sensor or the output of a gyro sensor (not shown).

The road traffic information recognition unit 220 recognizes the "road traffic information" based on the communication with the navigation server (road traffic information source) 100.

The route setup unit 230 sets up plural routes for guiding the vehicle M to the target position based on the "actual travel information" recognized by the actual travel information recognition unit 210 and the "road traffic information" recognized by the road traffic information recognition unit 210.

The actual route recognition unit 231 recognizes, out of the plural routes set up by the route setup unit 230, the route on which the vehicle M is actually traveling as the "actual route" based on the "actual travel information" recognized by the actual travel information recognition unit 210.

The virtual route recognition unit 232 recognizes, out of the plural routes set up by the route setup unit 230, a route that differs from the actual route as a "virtual route".

The virtual travel information recognition unit 240 recognizes a "virtual travel information" including a virtual position of the vehicle M on the virtual route based on the "road traffic information" recognized by the road traffic information recognition unit 220.

The liquid crystal panel 250 displays the actual travel information, the actual route, the virtual travel information and the virtual route.

The operation buttons 252 are provided so as to allow the user to perform various setup operations such as setting up the target position.

The functions of the navigation server 100 and the car navigation apparatus 200 configured as above will now be described with reference to FIGS. 2 through 5.

The recognition process of the "road traffic information" by the navigation server 100 will now be described with reference to FIGS. 2 and 3.

Figure 2:
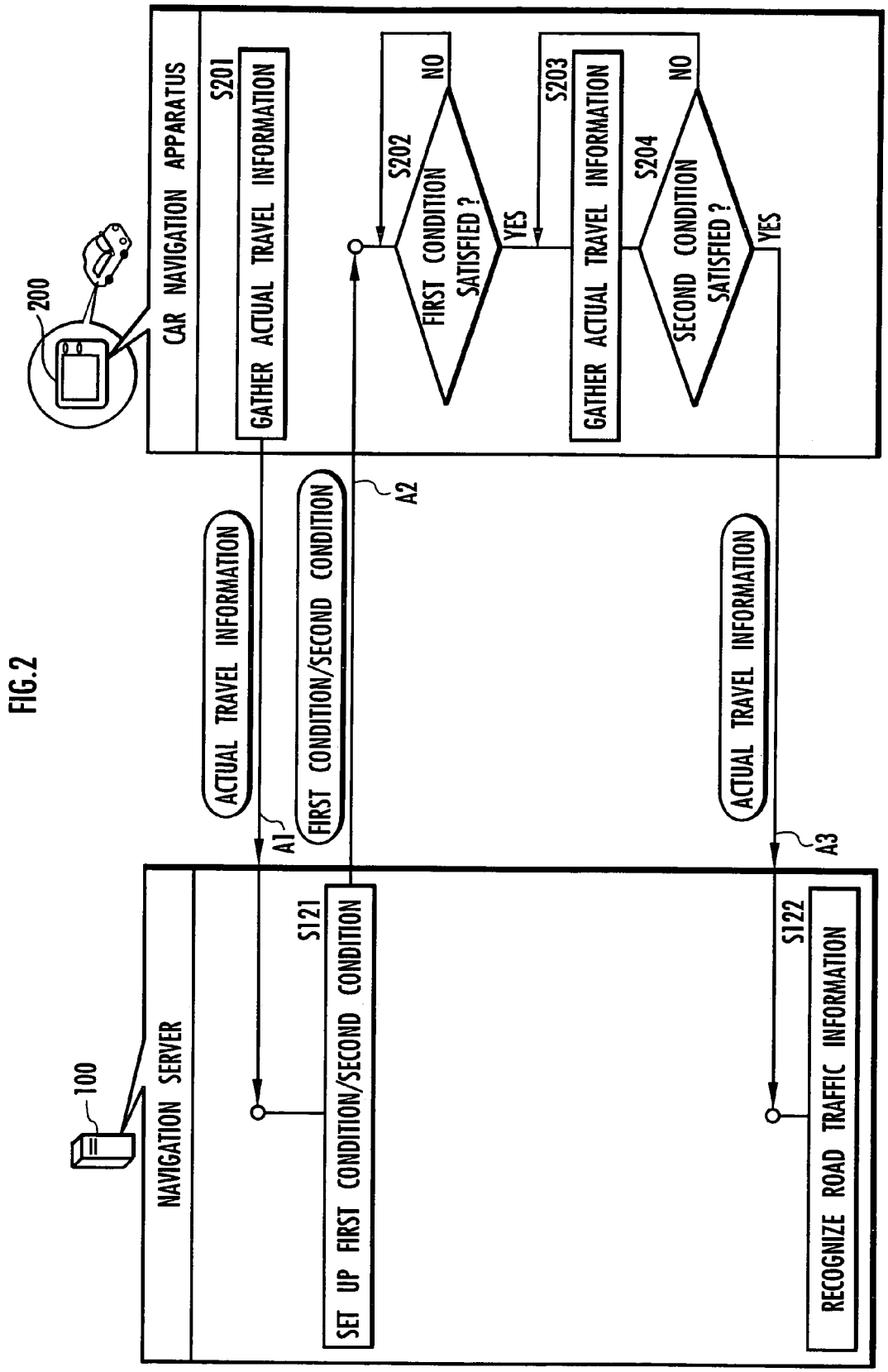
FIGS. 2 through 5 are diagrams explaining the functions of the traffic information management system and the navigation apparatus according to the preferred embodiment of the present invention.
Figure 3:
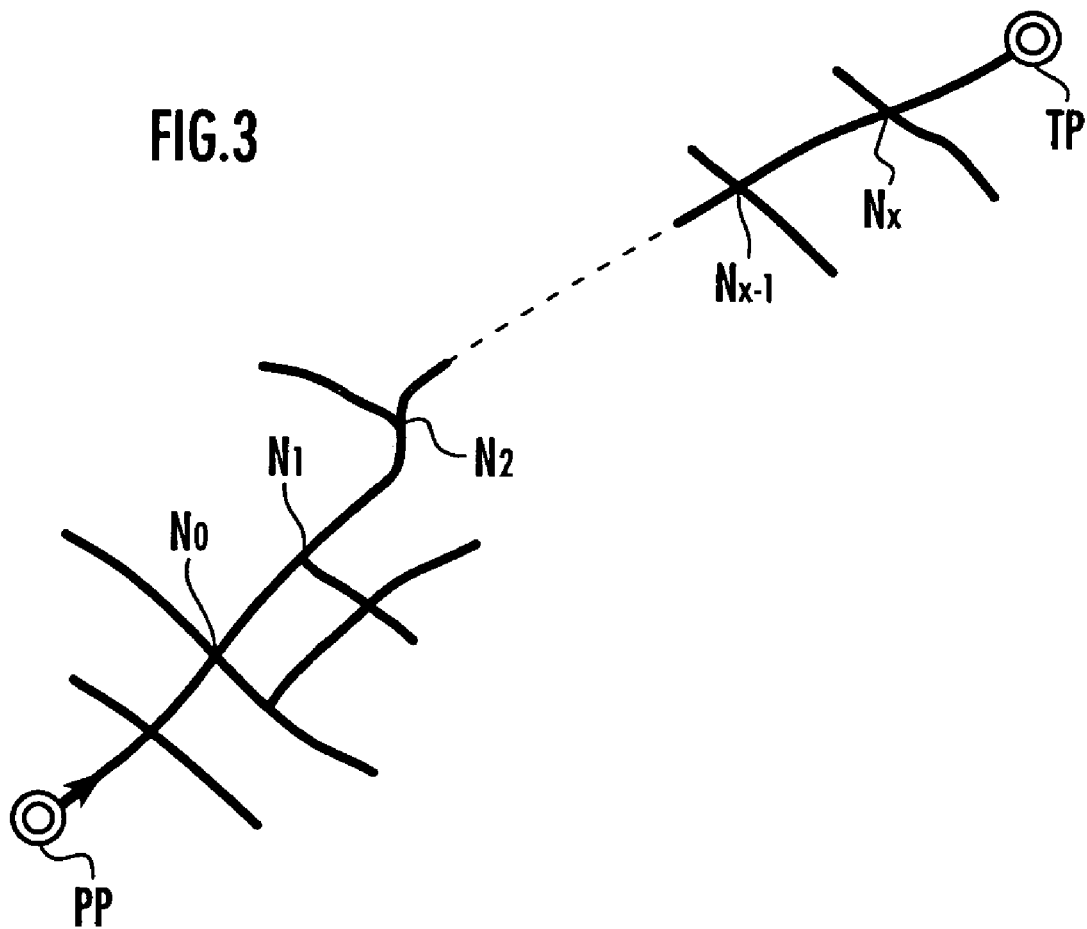

First, at appropriate timings such as when a predetermined time has come or when the user performs a predetermined operation on the car navigation apparatus 200, the actual travel information recognition unit 210 of the car navigation apparatus 200 recognizes the "actual travel information" including the present position, the target position and the direction of travel of the vehicle M (S201 of FIG. 2). Further, the "actual travel information" is sent from the car navigation apparatus 200 to the navigation server 100 (arrow A1 of FIG. 2).

Next, in the navigation server 100, the road traffic information management unit 130 sets up, based on the actual travel information of the vehicle M and the road information read out from the DB 102, a "first condition" for having the car navigation apparatus 200 start gathering the actual travel information and a "second condition" for transmitting the gathered travel information (S101). Actually, as illustrated in FIG. 3, based on the present position PP, the target position TP and the direction of travel shown by the arrow of the vehicle M, a node $N_o$ is set up as a starting position for the car navigation apparatus 200 to start gathering the actual travel information, and nodes $N_i$ (i=1, 2, and so on) on the way to the target position TP are set up, which are positions for sending the gathered actual travel information to the navigation server 100. The passing of node $N_{i-1}$ is set as the "first condition" for starting the gathering of traffic information. Further, the passing of node $N_i$ is set as the "second condition" for sending the actual travel information from node $N_{i-1}$ to node $N_i$ to the navigation server 100.

Next, the "first condition" and "second condition" are sent from the navigation server 100 to the car navigation apparatus 200 (arrow A2 of FIG. 2). At this time, the first and second conditions are stored in a storage unit (not shown) of the car navigation apparatus 200.

Then, when the actual travel information recognition unit 210 determines that the first condition has been fulfilled (YES in S202 of FIG. 2), the gathering of the actual travel information is started (S203 of FIG. 2). Further, when the actual travel information recognition unit 210 determines that the second condition has been fulfilled (YES in S204 of FIG. 2), the "actual travel information" is sent from the car navigation apparatus 200 to the navigation server 100 (arrow A3 of FIG. 2). The "actual travel information" includes information such as the time-series variation of the position of the vehicle M from node $N_{i-1}$ to node $N_i$. The gathering of the actual travel information and the like by the car navigation apparatus 200 mounted to the vehicle M (S202 through S204, refer to arrow A3 of FIG. 2) is continued until the vehicle reaches the target position TP or when the distance to the target position TP is equal to or less than a predetermined distance.

Thus, the navigation server 100 receives a large amount of actual travel information sent from the car navigation apparatuss 200 mounted to a number of vehicles M, and the road traffic information recognition unit 120 recognizes the "road traffic information" based on the large amount of actual travel information (S102 of FIG. 2). The "road traffic information" includes, for example, the predicted travel time between nodes. The road traffic information is successively updated and recognized, and managed by the DB 102.

As for the paths whose actual travel information cannot be gathered from car navigation apparatuss 200, the road traffic information recognition unit 130 can recognize the "road traffic information" such as the degree of traffic jam and the predicted travel time of the roads based on the communication with the FM radio stations and beacons (not shown).

Figure 4:
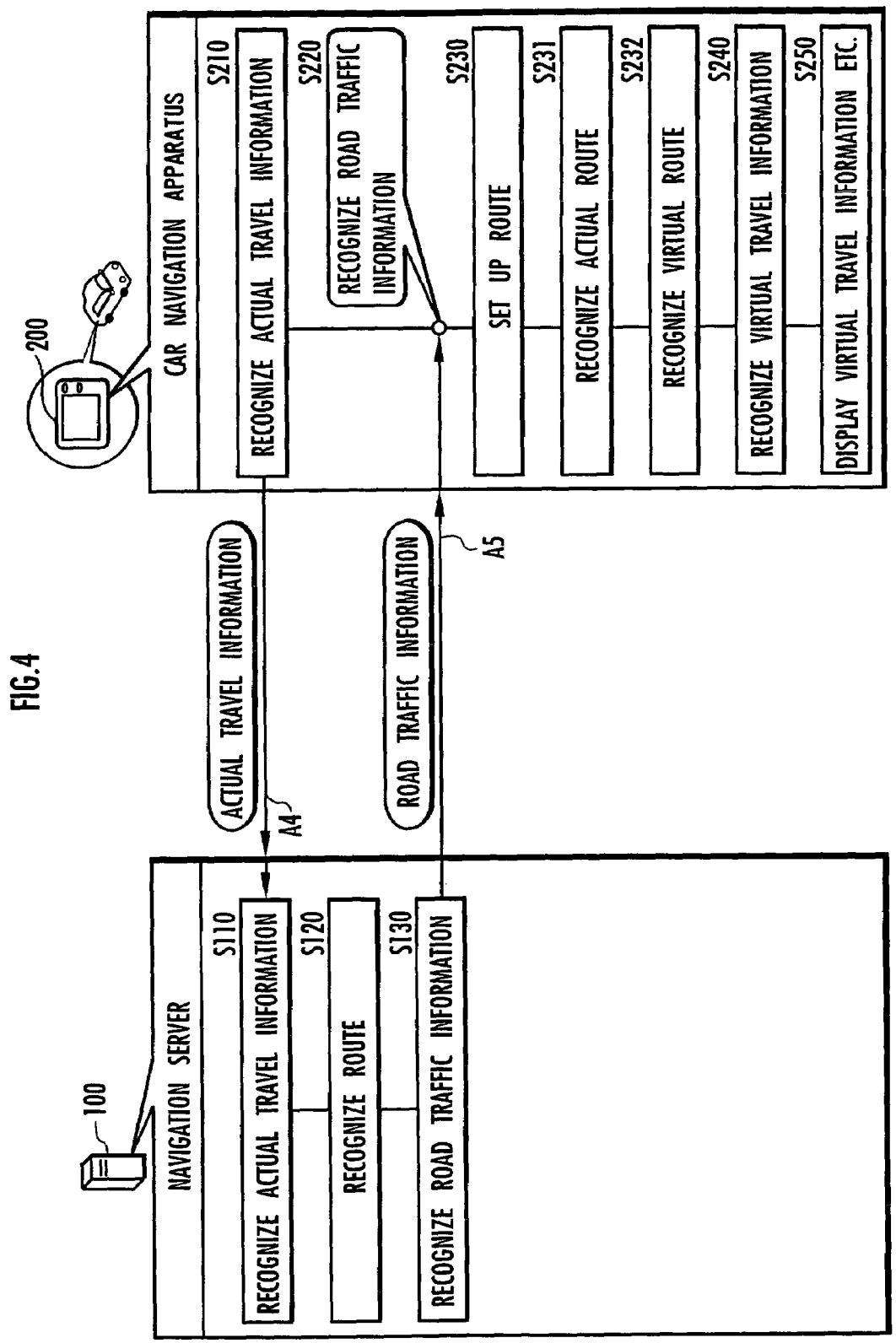
Figure 5A:
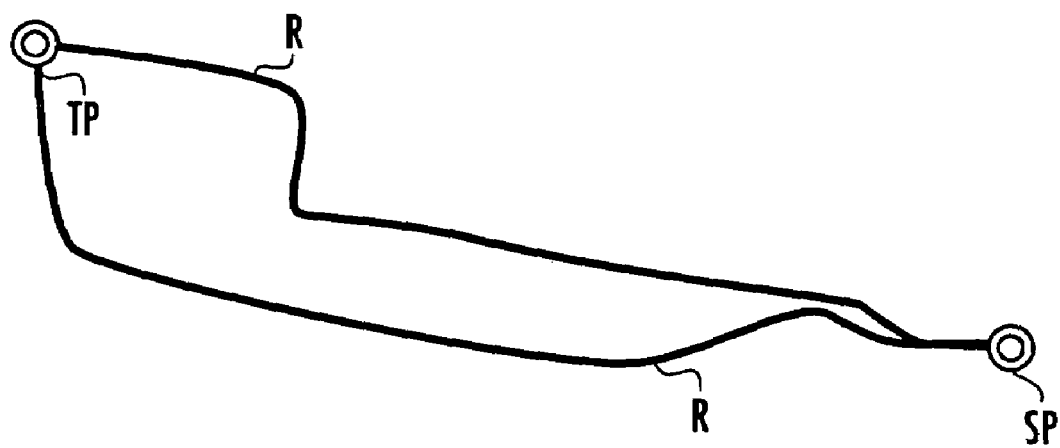
Figure 5B:
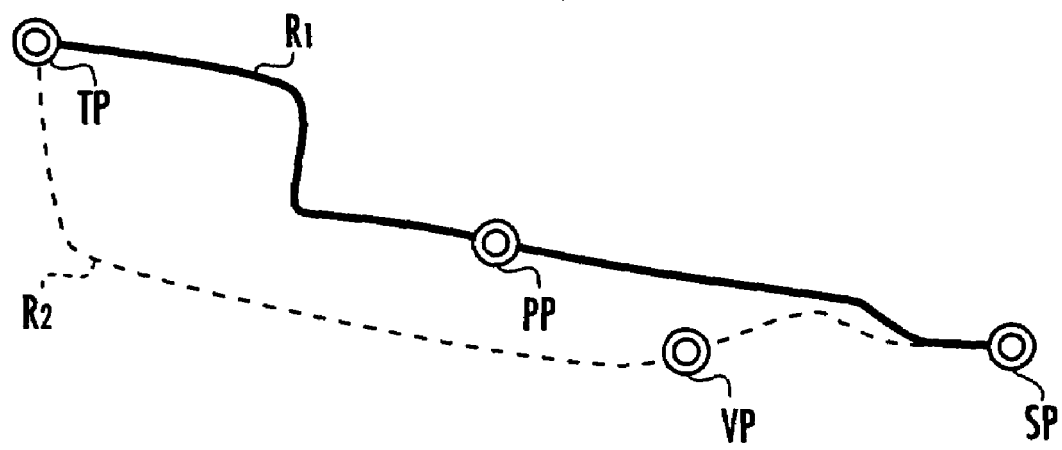

Next, FIGS. 4 and 5 are referred to in describing the process for providing information to the user through the car navigation apparatus 200.

First, the actual travel information recognition unit 210 of the car navigation apparatus 200 recognizes the "actual travel information" including the position, the target position and the direction of travel of the vehicle M (S210 of FIG. 4). The "actual travel information" is transmitted and provided from the car navigation apparatus 200 to the navigation server 100 (arrow A4 of FIG. 4), and recognized by the travel information recognition unit 110 (S110 of FIG. 4).

Further, the route recognition unit 120 sets up and recognizes plural routes from the position of vehicle M included in the actual travel information to the target position (S120 of FIG. 4). Further, regarding route recognition, it is also possible to utilize the road traffic information recognized by the road traffic information management unit 130.

Moreover, the road traffic information management unit 130 reads out and recognizes the "road traffic information" of plural "routes" from the DB 102 (S130 of FIG. 4). The road traffic information recognized based on DB 102 is recognized according to the procedures shown in FIGS. 2 and 3. On that basis, the road traffic information management unit 130 sends and provides the "road traffic information" of plural routes from the navigation server 100 to the car navigation apparatus 200 (arrow A5 of FIG. 4).

Incidentally, it is possible to have the car navigation apparatus 200 send the actual travel information intermittently to the navigation server 100 (refer to arrow A4 of FIG. 4), and in response, have the navigation server 100 send the road traffic information intermittently to the car navigation apparatus 200 (refer to arrow A5 of FIG. 4). The transmission timing of the actual travel information can be, for example, each time the vehicle M travels for a predetermined distance, each time the vehicle M reaches a predetermined position, or each time a predetermined period of time passes during the traveling of the vehicle.

Accordingly, the road traffic information recognition unit 220 of the car navigation apparatus 200 recognizes the road traffic information of the actual route and the virtual route (S220 of FIG. 4). Further, the route setup unit 230 sets up plural "routes" for guiding the vehicle M to the target position based on the actual travel information of the vehicle M and the road traffic information of the actual and virtual routes. For example, as shown in FIG. 5(a), the position of the vehicle M when the user sets up the target position (starting position) is set as the start point and the target position TP is set as the end point, and a route R connecting the start point and the end point is set up according to the map data stored in the storage unit (not shown) and the traffic information obtained from the outside.

Thereafter, at a predetermined timing, the actual route recognition unit 231 recognizes the "actual route" on which the vehicle M is actually traveling out of the plural routes set up by the route setup unit 230, based on the position and the direction of travel of the vehicle M included in the actual travel information (S231 of FIG. 4). Moreover, the virtual route recognition unit 232 recognizes a route out of the plural routes that differs from the recognition route as the "virtual route" (S232 of FIG. 4).

The "predetermined timing" includes a timing in which the user manipulates the operation buttons 252 in a predetermined way, a timing in which the velocity or acceleration of the vehicle M reaches a predetermined value, a timing in which a predetermined time has passed after the target position is set up by the user, and a timing in which the routes are successively updated and set up based on the road traffic information intermittently provided by the navigation server 100 (refer to S230 of FIG. 4).

For example, if the vehicle M is at position PP as shown in FIG. 5(*b*), regarding the routes R shown in FIG. 5(*a*), the upper route R is recognized as an actual route (heavy line) $R_1$ and the lower route R is recognized as a virtual route (dashed line) $R_2$.

Further, the virtual travel information recognition unit 240 recognizes a "virtual travel information" including the virtual position of the vehicle M based on the "actual travel information" and the "road traffic information" (S240 of FIG. 4). For example, as shown in FIG. 5(*b*), a virtual position VP on the virtual route $R_2$ is estimated. The virtual position VP corresponds to an estimated virtual position assuming that the vehicle M has traveled along the virtual route $R_2$ for a "travel time" that the vehicle M traveled from the starting position SP to the present position PP contained in the actual travel information.

Then, as shown in FIG. 5(*b*), the actual route $R_1$, the actual position PP, the virtual route $R_2$ and the virtual position VP are displayed on the liquid crystal panel 250 of the car navigation apparatus 200 (S250 of FIG. 4).

According to the server (traffic information management system) 100 and the car navigation apparatus 200 having the above functions, the "virtual route" is a route set up based on the actual travel information and the road traffic information (refer to S232 of FIG. 4), so in view of these information, there is high possibility that the user selects the virtual route as a route that differs from the actual route. Moreover, the "virtual travel information" is based on the road traffic information, so though it is virtual information, it is highly reliable since the actual road traffic information is reflected thereon (refer to S240 of FIG. 4). Thereby, the value and reliability of the virtual travel information on the virtual route is enhanced.

Thus, the present system is capable of successively providing to the user information such as the "virtual travel information" that is helpful in comparing and reviewing the "actual route" that the user is actually traveling with the "virtual route".

Furthermore, the road traffic information sent from the navigation server 100 to the car navigation apparatus 200 is limited to the road traffic information related to the plural routes (refer to arrow A5 and S120 of FIG. 4). Therefore, the load of information processing required for setting up routes based on the road traffic information (refer to S230 of FIG. 4) and for recognizing virtual travel information (refer to S240 of FIG. 4) can be reduced.

Incidentally, the display mode of the actual route $R_1$, the present position PP, the virtual route $R_2$ and the virtual position VP can vary according to the car navigation apparatus 200. For example, if the present position PP is closer to the target position TP than the virtual position VP, it is possible to indicate the actual route $R_1$ and the present position PP using a color different from that of the virtual route $R_2$ and the virtual position VP.

What is claimed is:

1. A navigation apparatus for guiding a movable object to a target position through provision of information to the movable object, comprising:

a road traffic information recognition means for recognizing road traffic information based on communication with a road traffic information source;

an actual travel information recognition means for recognizing actual travel information including a position of the movable object and a target position thereof;

a route setup means for setting up plural routes for reaching the target position based on the road traffic information recognized by the road traffic information recognition means and the actual travel information recognized by the actual travel information recognition means;

an actual route recognition means for recognizing, out of the plural routes set up by the route setup means, a route on which the movable object is actually traveling as an actual route based on the actual travel information recognized by the actual travel information recognition means;

a virtual route recognition means for recognizing, out of the plural routes set up by the route setup means, a route that differs from the actual route as a virtual route;

a virtual travel information recognition means for recognizing virtual travel information including a virtual position of the movable object on the virtual route based on the road traffic information recognized by the road traffic information recognition means; and a display means for displaying the actual travel information, the actual route, the virtual travel information and the virtual route.

2. The navigation apparatus according to claim 1, wherein the virtual travel information recognition means recognizes the virtual travel information including the virtual position of the movable object assuming that the movable object has traveled on the virtual route for a travel time from a certain position to a present position.

3. The navigation apparatus according to claim 1, wherein the road traffic information recognition means recognizes the road traffic information intermittently; and every time the road traffic information recognition means recognizes the road traffic information, the route setup means updates the setup of the routes, the actual route recognition means updates the recognition of the actual route, the virtual route recognition means updates the recognition of the virtual route, the virtual travel information recognition means updates the recognition of the virtual travel information, and the display means updates the display.

4. The navigation apparatus according to claim 3, wherein every time the movable object passes a position that has been set up intermittently, or every time a predetermined period of time passes during the travel time of the movable object, or every time the movable object moves for a predetermined distance, the road traffic information recognition means recognizes the road traffic information intermittently.

5. A navigation server, comprising:

actual travel information recognition means for recognizing actual travel information of a movable object based on communication with a navigation apparatus according to claim 1;

route recognition means for recognizing plural routes for the movable object based on actual travel information recognized by the actual travel information recognition means; and means for providing, as the road traffic information source, road traffic information of the plural routes recognized by the route recognition means to the navigation apparatus.

6. A navigation apparatus for guiding a movable object to a target position through provision of information to the movable object, comprising:
- a road traffic information recognition unit configured to recognize road traffic information based on communication with a road traffic information source;
- an actual travel information recognition unit configured to recognize actual travel information including a position of the movable object and a target position thereof;
- a route setup unit configured to set up plural routes for reaching the target position based on the road traffic information recognized by the road traffic information recognition unit and the actual travel information recognized by the actual travel information recognition unit;
- an actual route recognition unit configured to recognize, out of the plural routes set up by the route setup unit, a route on which the movable object is actually traveling as an actual route based on the actual travel information recognized by the actual travel information recognition unit;
- a virtual route recognition unit configured to recognize, out of the plural routes set up by the route setup unit, a route that differs from the actual route as a virtual route;
- a virtual travel information recognition unit configured to recognize virtual travel information including a virtual position of the movable object on the virtual route based on the road traffic information recognized by the road traffic information recognition unit; and
- a display unit configured to display the actual travel information, the actual route, the virtual travel information and the virtual route.

7. The navigation apparatus according to claim 6, wherein the virtual travel information recognition unit recognizes the virtual travel information including the virtual position of the movable object assuming that the movable object has traveled on the virtual route for a travel time from a certain position to a present position.

8. The navigation apparatus according to claim 6, wherein
- the road traffic information recognition unit recognizes the road traffic information intermittently; and
- every time the road traffic information recognition unit recognizes the road traffic information, the route setup unit updates the setup of the routes, the actual route recognition unit updates the recognition of the actual route, the virtual route recognition unit updates the recognition of the virtual route, the virtual travel information recognition unit updates the recognition of the virtual travel information, and the display unit updates the display.

9. The navigation apparatus according to claim 8, wherein every time the movable object passes a position that has been set up intermittently, or every time a predetermined period of time passes during the travel time of the movable object, or every time the movable object moves for a predetermined distance, the road traffic information recognition unit recognizes the road traffic information intermittently.

10. A method for guiding a movable object to a target position through provision of information to the movable object, comprising:
- recognizing road traffic information based on communication with a road traffic information source;
- recognizing actual travel information including a position of the movable object and a target position thereof;
- setting up plural routes for reaching the target position based on the road traffic information and the actual travel information;
- recognizing out of the plural routes a route on which the movable object is actually traveling as an actual route based on the actual travel information;
- recognizing out of the plural routes a route that differs from the actual route as a virtual route;
- recognizing virtual travel information including a virtual position of the movable object on the virtual route based on the road traffic information; and
- displaying the actual travel information, the actual route, the virtual travel information and the virtual route.

11. The method according to claim 10, wherein the step of recognizing the virtual travel information including the virtual position of the movable object comprises assuming that the movable object has traveled on the virtual route for a travel time from a certain position to a present position.

12. The method according to claim 10, wherein the step of recognizing road traffic information comprises recognizing the road traffic information intermittently; and the method further comprises, every time the road traffic information is recognized,
- updating the setup of the routes,
- updating the recognition of the actual route,
- updating the recognition of the virtual route,
- updating the recognition of the virtual travel information, and
- updating the display.

13. The method according to claim 12, wherein every time the movable object passes a position that has been set up intermittently, or every time a predetermined period of time passes during the travel time of the movable object, or every time the movable object moves for a predetermined distance, recognizing the road traffic information intermittently.

* * * * *